May 30, 1933.     H. F. GLEIM     1,911,229
INJECTING DEVICE
Filed Feb. 12, 1932
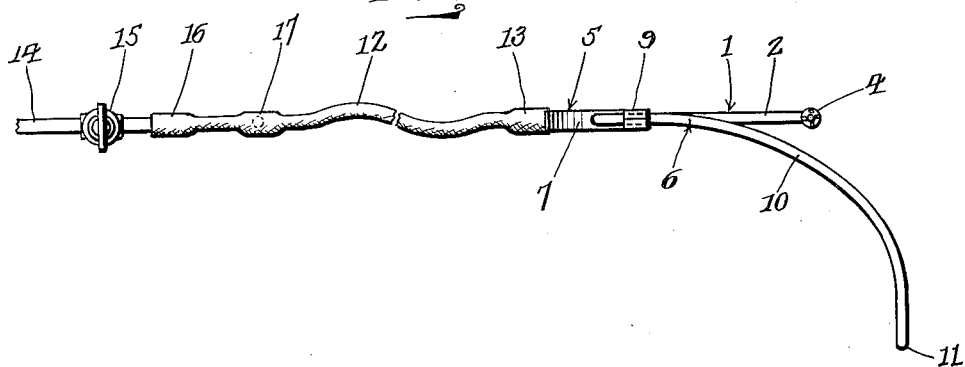
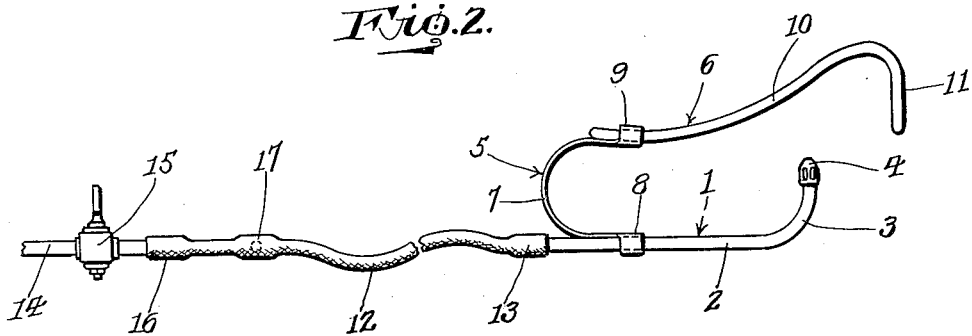
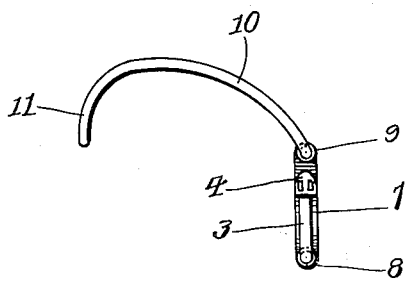 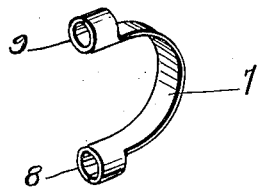
Inventor
Harry F. Gleim
By Geo. P. Kimmel
Attorney Patented May 30, 1933

1,911,229

UNITED STATES PATENT OFFICE

HARRY F. GLEIM, OF PORTSMOUTH, OHIO

INJECTING DEVICE

Application filed February 12, 1932. Serial No. 592,619.

This invention relates to a fluid injecting device for use in connection with the irrigating of the human colon, and has for its object to provide, in a manner as hereinafter set forth, a device of the class referred to including an ejector element capable of being clamped stationary to and without discomfort to the patient during the irrigating operation; including means for controlling the flow of the irrigation fluid; and means to prevent back flow of the fluid and any fecal matter to the source of supply of the fluid.

Further objects of the invention are to provide, in a manner as hereinafter set forth, an injecting device for the purpose referred to which is simple in its construction and arrangement, strong, durable, compact, readily installed with respect to the patient, throughly efficient in its use, conveniently handled and comparatively inexpensive to manufacture.

To the above ends essentially and others which may hereinafter appear, the invention consists of such parts, and such combination of parts which fall within the scope of the invention as claimed.

In the drawing:

Figure 1 is a top plan view of the device broken away intermediate its ends.

Figure 2 is a side view of the device broken away intermediate its ends.

Figure 3 is a view looking towards the injecting end of the device.

Figure 4 is a perspective view of the resilient coupling member.

The device includes an ejector element 1 formed of a horizontal leg 2 which merges at one end in an upstanding leg 3 provided with a perforated nozzle 4. The element 1 can be formed of any suitable material. The leg 2 is of any desired length, but preferably of a length greater than the leg 3, the latter being of curved form and disposed at right angles to leg 2. Adjustably connected to the leg 3 is a resilient coupling element 5 for a curved clamping element 6. The element 5 comprises a resilient U-shaped body part 7 provided at its ends with offset frictional grips 8, 9 in the form of split resilient sleeves which engage with and are adjustable lengthwise of the leg 2 and outer end portion of element 6. The grip 8 is mounted on leg 2 and grip 9 on element 6. The element 5 can be removed from element 6 and leg 2. The element 6 includes a part 10 of o-gee curvature and an end part 11 disposed at right angles to the inner end of part 10. The part 10 fits against the groin and part 11 partly around the thigh of the patient.

The device also includes an irrigation fluid line 12 for conducting the fluid to element 1. The line 12 is in the form of a resilient tubing having one end terminal portion thereof mounted on and encompassing the free end of leg 2, as at 13. A valve controlled feed line 14, which preferably is in the form of a rigid pipe leads from a source, not shown, of the irrigation fluid. The line 14 is provided with a valve 15 for closing discharge from line 14, as well as for controlling the flow of the fluid. The other end terminal portion 16 of line 12 encompasses the discharge end of line 14. Arranged in line 12 adjacent the terminal portion 16 of the latter is a check valve 17 to prevent back flow to line 14.

The elements 1, 5, 6 and lines 12 and 14 are detachably connected together.

What I claim is:—

1. In an injecting device for colon irrigation of that type including an injector element means for coupling the injector element to the body of a person, said means including a resilient upstanding coupling element provided at one end with a frictional grip for adjustable engagement with the injector element lengthwise of the latter, a curved clamping element having a part to fit against the groin and a part to extend partly around the thigh of a person, and said coupling element having its other end formed with a frictional grip for adjustable engagement with and lengthwise of that part of the clamping element which fits against the groin.

2. In an injecting device for colon irrigation of that type including an ejector element, means for coupling the injector element to the body of a person, said means including a resilient upstanding coupling element provided at one end with a frictional grip for adjustable engagement with the injector element lengthwise of the latter, a curved clamping element having a part to fit against the groin and a part to extend partly around the thigh of a person, said coupling element having its other end formed with a frictional grip for adjustable engagement with and lengthwise of that part of the clamping element which fits against the groin, said coupling element being of U-shape contour, and that part of the clamping element fitting against the groin being of o-gee curvator, said parts of the clamping element being disposed at right angles with respect to each other.

3. In an injecting device for colon irrigation of that type including an ejector element, means for coupling the injector element to the body of a person, said means including a resilient upstanding coupling element provided at one end with a frictional grip for adjustable engagement with the injector element lengthwise of the latter, a curved clamping element having a part to fit against the groin and a part to extend partly around the thigh of a person, and said coupling element having its other end formed with a frictional grip for adjustable engagement with and lengthwise of that part of the clamping element which fits against the groin, each of said grips being in the form of a split resilient sleeve.

4. In an injecting device for colon irrigation of that type including an ejector element, means for coupling the injector element to the body of a person, said means including a resilient upstanding coupling element provided at one end with a frictional grip for adjustable engagement with the injector element lengthwise of the latter, a curved clamping element having a part to fit against the groin and a part to extend partly around the thigh of a person, said coupling element having its other end formed with a frictional grip for adjustable engagement with and lengthwise of that part of the clamping element which fits against the groin, said coupling element being of U-shape contour, and that part of the clamping element fitting against the groin being of o-gee curvature, said parts of the clamping element being disposed at right angles with respect to each other, each of said grips being in the form of a split resilient sleeve.

In testimony whereof, I affix my signature hereto.

HARRY F. GLEIM.